United States Patent [19]
Rahm

[11] Patent Number: 5,243,930
[45] Date of Patent: Sep. 14, 1993

[54] ANIMAL FEEDER

[76] Inventor: Maurice Rahm, R. #2, Box 91, Truman, Minn. 56088

[21] Appl. No.: 892,278

[22] Filed: Jun. 2, 1992

[51] Int. Cl.$^5$ .............................................. A01K 5/00
[52] U.S. Cl. ...................................... 119/54; 119/56.1
[58] Field of Search .................. 119/53, 53.5, 54, 55, 119/56.1, 57.91

[56] References Cited

U.S. PATENT DOCUMENTS

| | | | |
|---|---|---|---|
| 852,211 | 4/1907 | Allen | 119/53.5 |
| 1,199,655 | 9/1916 | Battle | 119/54 |
| 1,222,556 | 4/1917 | McCormick | 119/54 |
| 1,269,108 | 6/1918 | Nichols | 119/53.5 |
| 2,221,974 | 11/1940 | Kellogg . | |
| 2,308,735 | 1/1943 | Zahn . | |
| 2,543,916 | 3/1951 | Lewis . | |
| 2,830,557 | 4/1958 | Frush . | |
| 4,278,049 | 7/1981 | Van Dusseldorp . | |
| 4,351,274 | 9/1982 | Pannier . | |
| 4,377,130 | 3/1983 | Schwieger et al. . | |
| 5,036,798 | 8/1991 | King . | |

Primary Examiner—Gene Mancene
Assistant Examiner—Thomas Price
Attorney, Agent, or Firm—Donald A. Jacobson

[57] ABSTRACT

This animal feeder is demand driven since only a feeding animal will cause feed to be dispensed. An elevated hopper containing granular feed has a pair of downward extensions which decrease in cross-section downward to an opening. A pair of funnels are pivotally mounted immediately below these extensions and extend upward to bracket the extension. The funnels are oriented vertically with the large end up unless the funnel is disturbed. The small low ends of the funnels extend downward next to the feed trough bottom. A feeding animal can move a low end to either side and incline the funnel from vertical. A planar metering plate is centrally mounted within each funnel oriented such that it is horizontal when the funnel is vertical. The metering plates are located immediately below each extension, are slightly larger than the openings, and do not extend completely across the funnel. Feed from the hopper will build up on a horizontal plate surface rather than flow through the funnel. When an animal displaces a funnel the plate is inclined off horizontal to permit feed to slide off the edge through the funnel into the trough. This occurs only when an animal is feeding and displaces the funnel.

5 Claims, 3 Drawing Sheets

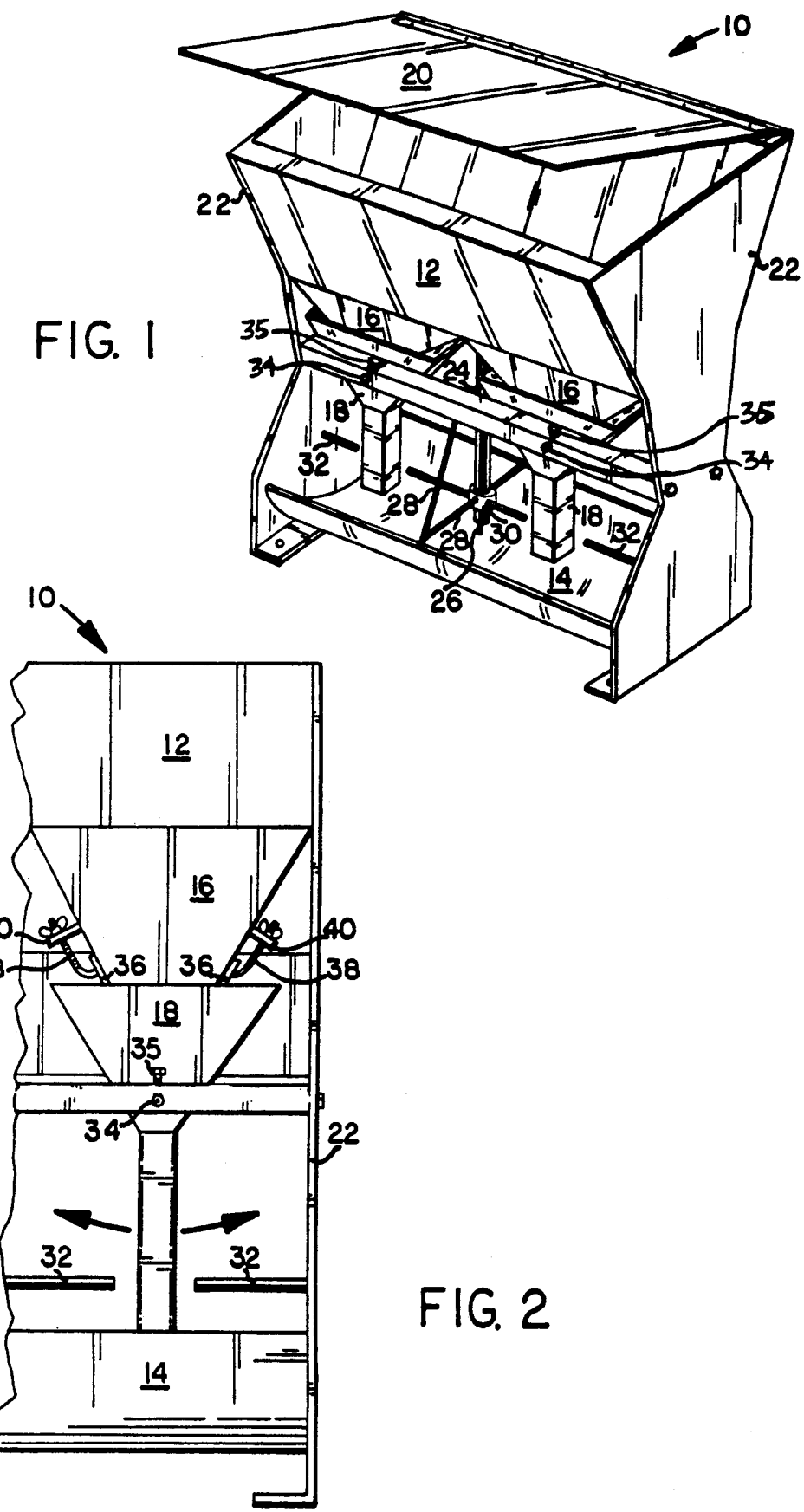

ANIMAL FEEDER

FIELD OF THE INVENTION

The present invention relates to livestock feeders and more particularly to hog feeders using metering apparatus operated by the feeding animal itself to provide a demand driven feeder.

DESCRIPTION OF THE PRIOR ART

Various demand operated animal feeders have been found which are exemplary of U.S. prior art. They are the following:

| Name of Inventor | U.S. Pat. No. |
| --- | --- |
| B. A. King | 5,036,798 |
| L. D. Schwieger | 4,377,130 |
| S. R. Pannier | 4,351,274 |
| L. R. Van Dusseldorp | 4,278,049 |
| C. O. Frush | 2,830,557 |
| E. Lewis | 2,543,916 |
| O. F. Zahn | 2,308,735 |
| P. A. Kellogg | 2,221,974 |

King uses a sliding gate which determines the size of a bottom discharge opening. A mechanism permits the animal to actuate the movement of the gate into a hopper to dispense feed. Schwieger uses an elongated agitator which dispenses feed through a slot when agitated by an arm connected to the grate which is agitated by an animal. Pannier also uses an agitator operated by feeding livestock which directs feed into a plurality of partitioned feeding troughs. Van Dusseldrop uses an agitator or butt plate located within a trough a predetermined distance from the bottom. A wire grid extends from the butt plate upwardly into a hopper such that movement of the butt plate by animals causes movement of the grid. Frush uses an inclination of the entire hopper around a pivot point to provide feed into a trough. Lewis has the lower end of a hopper extending downward into a trough such that feed will block further flow until consumed. Kellogg uses a pivotable hopper also to dispense feed.

None of these inventions utilize metering apparatus having a plate which is mounted below an opening in a hopper, and which is pivoted to meter grain into a trough with the pivoting action provided by a feeding animal.

SUMMARY OF THE INVENTION

This feeder for solid granules of animal feed provides two side by side demand operated animal feeding stations. Feed from an overhead hopper is fed through holes in the bottom of two downward extensions then through a funnel mounted below each hole into a feed trough. Each downward extension has a rectangular cross-section which tapers inward and has a terminus with a rectangular shaped open hole in the bottom. The funnel, which has a matching rectangular cross-section, is pivotally mounted. A metering apparatus formed by a plate mounted perpendicular to the funnel axis within the funnel meters the flow of feed through the funnel.

The funnels are balanced such that unless disturbed the funnels are vertical with the large end open upward. The funnels are sized and located such that they overlap and extend upward around the bottom portion of the opposite extensions with enough space between the two to permit the funnel to rotate. The opposite end of the funnels extend downward into a feed trough where an animal can pivot the funnel from side and incline it from vertical.

The metering plate extends completely across the funnel parallel to the pivot pin but has a gap between the plate and funnel on each end perpendicular to the pin. The metering plate is attached to the funnel such that it is horizontal when the funnel is vertical.

Two sets of stops are provided for each funnel. One pair is mounted on the feeder opposite to the lowest end of the funnel to restrict the angle of inclination of the funnel from vertical. A second pair of stops are mounted within and on the funnel itself near the open top. These stops extend inward toward the adjacent extension and are arranged to strike the sides of the extension before the funnel end strikes the other set of stops. These upper stops in striking the extension prevent feed from bridging within the extension.

A pair of adjustable slides are slideably mounted on the extensions along and in the plane of the sides parallel to the pivot axis. With the metering plate horizontal, feed will flow through the slides until a column is built up on the plate between the slides which reaches upward to the extension. These adjustable slides permit changing the amount of feed deposited on the top of a horizontal metering plate by changing the height of this column of feed.

When an animal pushes the low end of the funnel against a lower stop this will cause the funnel to pivot. This will incline the metering plate from horizontal which will cause the feed on top of the metering plate to spill off of the low side. Each time the funnel is cycled from horizontal to an inclined attitude this occurs. This results in feed being metered out of the hopper as long as an animal is feeding.

Water is introduced into the trough by a nuzzle valve operated by the animals. This water will wet feed extending upward from the trough into the low end of the funnel which can clog the funnel. A chain supporting a pipe is suspended by the plate pivot pin under the metering plate, and hangs down within the lower end of the funnel which clears this lower funnel end by swinging against a side when a funnel is inclined.

DESCRIPTION OF THE DRAWINGS

FIG. 1 is an isometric overview of the feeder.

FIG. 2 is a front view of a detail of the feeder showing the right hand feeding station.

DETAILED DESCRIPTION OF THE PREFERRED EMBODIMENT

Figure 3:
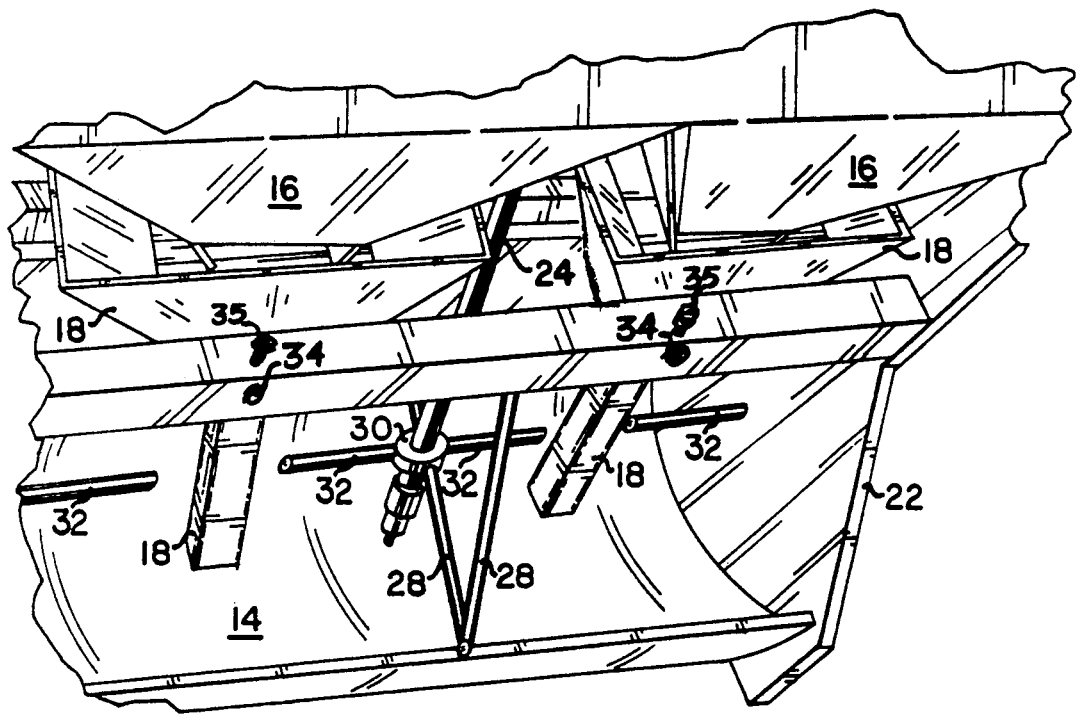
FIG. 3 is an inclined front view of a portion of the feeder showing the operating parts.

Animal feeder 10 is shown in FIG. 1. The major components are: hopper 12 which stores granular feed to be dispensed, a watertight trough 14, two hopper extensions 16 and two funnels 18, hinged cover 20 and supporting structure 22. Funnels 18 are pivotally mounted on metal braces extending across support structure 22, which will be described in detail later. Hopper 12, mounted at the top of structure 22, has a top hinged cover 20 to keep rain and snow from the feed. Hopper 12 can also be hinged to swing away from over extensions 16 for ease in cleaning.

Water line 24 connected to a pressurized water source, not shown, terminates in a nuzzle valve 26. This permits an animal to drink and to bring water into trough 14 to wet any feed in the trough.

Braces 28 across hopper 14 support a cylindrical shaped retainer 30. Stops 32, made up of rods attached to and extending from structure 22 and from retainer 30, limit the horizontal motion of the lower ends of funnels 18. If desired, stops 32 could be attached to funnels 18 and extend outward to obtain the same results.

FIG. 2 shows one of the two funnels 18 in greater detail. Funnel 18 extends upward and brackets the lower end of extension 16. Funnel 18 is pivotally mounted and supported by pin 34 which extends through holes in the funnel and in a metal bracket extending between support structures 22. This permits funnel 18 to pivot within an angle limited by stops 32. A bolt 35 threaded within holes in the metal bracket extends inward to pin 34 to secure it in place. Funnel 18 is balanced such that when undisturbed it hangs vertically from pin 34 with its the low end centered between stops 32. A feeding animal can push against the lower end of funnel 18 against either stop 32 and cause the funnel to rotate.

Granular feed from hopper 12 flows through a hole 42 in the bottom of extensions 16 and into the large upward open end of funnel 18. Two extendable sides 36 are slideably mounted on opposite sides of extensions 16. Extendable sides 36 are adjusted by threaded rods 38. Rods 38 are bent at right angles, with one end of the rods extending through a hole in bracket 40 and the opposite end attached to extendable side 36. A wing nut engages the end of rod 38 which extending through brackets 40 to provide an adjusting means. This will be described further later.

In FIG. 3 the upper end of funnels 18 is shown enclosing the lower end of extensions 16. These have a spacing between them to allow freedom for funnel 18 to pivot.

Figure 4:
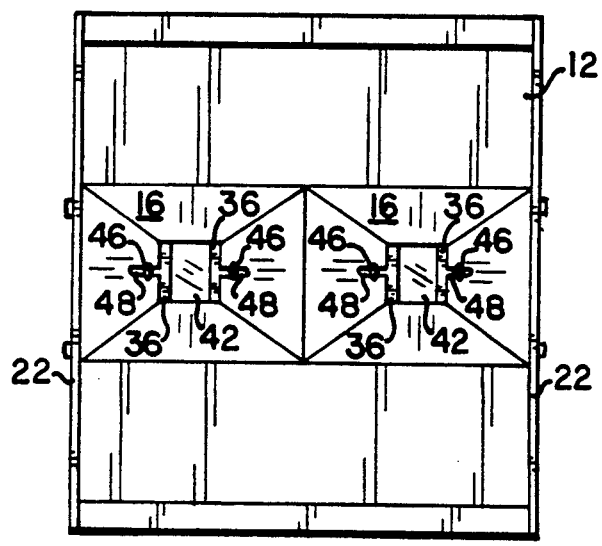
FIG. 4 is a top view of the feeder.

Looking down into hopper 12 as seen in FIG. 4, bottom openings 42 in extensions 16 can be seen. The ends of extendable sides 36 which extend below openings 42 can also be seen.

Figure 5:
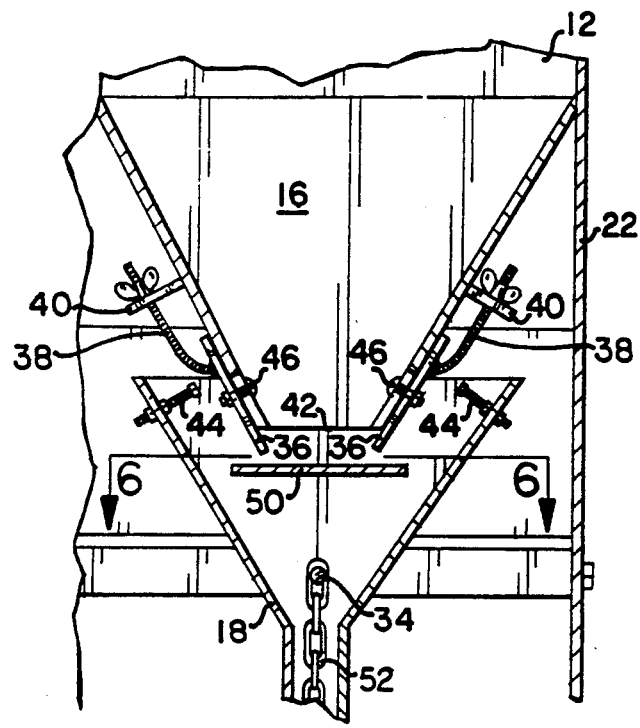
FIG. 5 is a front view of one of the feeders showing a cross-section of the operating parts.

In FIG. 5 upper stops 44, made up of bolts which extend through holes in the sidewalls of funnel 18, and which are secured by nuts on both sides of each sidewall can also be seen. Stops 44 are adjusted to strike the sides of extension 16 before the low end of funnel 18 strikes stops 32. When one of the stops 44 strike extension 16 this loosens any feed which may be bridging across opening 42 in the extension and cause it to drop through.

FIG. 4 and 5 together show all the parts of the adjustment means used in moving extendable sides 36 relative to extension 16. Bolts 46 extend through holes in extendable sides 36, through slots 48 in extension 16, and are secured in place by nuts. The heads of bolts 36 are larger than slots 48 but the body of the bolt can slide within the slot. Bolt 46 holds extendable sides 36 parallel to and against the sides of extensions 16. Bolts 38, since they extend through brackets 40 and are also attached to extendable slides 36, orient the sides as shown. Since bolts 46 are constrained to slide within slot 48, this defines the path which the slides will travel as the wing nuts on bolts 38 are tightened or loosened to change the amount extendable slides 36 extend below hole 42. Rotating the wing nuts in one direction will pull bolts 38 upward through the holes in brackets 40 while rotating them in the opposite direction will permit the weight of slides 36 to pull the slides downward to effect the adjustment. The wing nuts on bolts 38 are adjusted until slides 36 extend downward below each side of hole 42 the desired distance with each extending downward an equal amount. This adjustment provides a means for changing the amount of feed dispensed each time funnel 18 is inclined, as will be described later.

Figure 6:
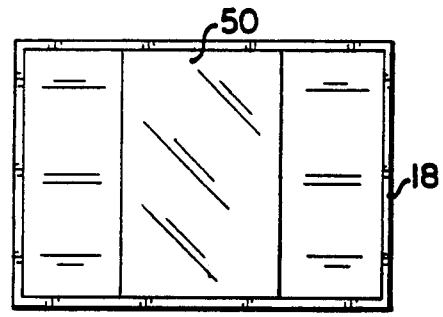
FIG. 6 is a view taken from 6—6 from FIG. 5.

Metering plate 50, shown in FIGS. 5 and 6, has a planar surface, is attached to the interior of funnel 18, and extends completely across the interior of funnel 18 in the direction of pin 34 but terminates a equal distance short of both the side walls of the funnel across the dimension perpendicular to the pin. Metering plate 5 is attached to funnel 18 such that when funnel 18 is vertical the plate is horizontal. The gaps between the ends of metering plate 50 and the walls of funnel 18 perpendicular to pin 34 provides a path for feed to flow around the metering plate.

As described above, when funnel 50 is vertical in its undisturbed state then metering plate 50 is horizontal. With a horizontal orientation of metering plate 50 any granular feed flowing through bottom hole 42 in extension 16 will build up into a column on top of the plate which will extend upward to the extension. A small amount of feed may initially spill over the ends of metering plate 50, but other than that the horizontal plate will block the flow of granular feed from extension 16 through funnel 18.

However, when an animal in feeding forces the low end of funnel 18 against stops 32 in either direction, this action will incline metering plate 50 and cause the column of feed positioned on the top of the plate to slide downward and spill off the low side of the plate through funnel 18 into trough 14. Some additional feed may continue to spill down this low side for a short time, but essentially the majority of the feed dispensed when metering plate 50 is inclined will be that column of feed positioned on the top of the horizontal metering plate initially. Therefore, the amount of feed metered through funnel 18 each time metering plate 50 is inclined can be changed by changing the distance between the ends of slides 36 and metering plate 50 since this changes the effective height of the column of feed upward to extension 16 which is supported by a horizontal metering plate.

As the animal continues to feed it will continue to move the low end of funnel 18 back and forth between stops 32. Each time metering plate 50 is rotated to a horizontal attitude a column of feed will be deposited upon its upper surface, and each time that the metering plate is inclined from horizontal this feed will be dispensed through funnel 18 as described above. An important feature of this operation is that feed is only metered down funnel 18 from metering plate 50 as long as a feeding animal rotates funnel 18 between horizontal and a stop. After an animal has finished feeding then funnel 18 will remain vertical and no feed will be dispensed through funnel 18.

Figure 7:
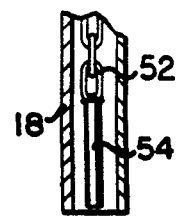
FIG. 7 is that portion of the funnel below the parting line of FIG. 5.

Since water is introduced into trough 14 this water will wet feed in the lower end of funnel 18 which can clog it. This is avoided, as shown in FIGS. 5 and 7 by suspending chain 52 from pin 34. A pipe 54 is welded to the lower end of chain 52 to provide mass. Each time that funnel 18 is inclined pipe 54 will strike the sides of funnel 18 and dislodge this wet feed from the funnel.

This results in a demand driven feeder that only dispenses preadjusted quantities of feed from the metering plate while an animal is actually feeding. The mass of the moving parts is small, being only the funnel 18 and the metering plate 50, and these are merely pivoted in operation. This results in an apparatus which is simple in structure, which is easy to fabricate, which requires only a minimum amount of force to operate, which permits even the smallest and youngest animal to activate, and which accurately meters out a preadjusted amount of granular feed each time that funnel 18 is inclined.

The feeder parts can be made from a number of metals or even from plastic. Parts exposed to water can be made of stainless steel to prevent rusting, however plastic and a number of other rustproof metals can also be used here.

While this invention has been described with reference to illustrative embodiments, these descriptions are not intended to be construed in a limiting sense. Various modifications of the illustrative embodiments, as well as other embodiments of the invention, will be apparent to persons skilled in the art upon reference to these descriptions. It is therefore contemplated that the appended claims will cover any such modifications or embodiments as fall within the true scope of the invention.

I claim:

1. Animal feeding apparatus for metering solid feed to animals comprising:
   a) a supporting structure;
   b) a hopper mounted upon the upper portion of said supporting structure, said hopper having a hollow downward extension, said extension having inclined sides, a large top opening and a small bottom opening;
   c) a feed trough mounted upon the lower portion of said supporting structure below said hopper extension; and
   d) metering apparatus mounted upon said supporting structure below the bottom opening in said hopper extension and above said feed trough for metering grain from the hopper to the trough comprising:
      i) a planar plate which is centered upon and larger than the bottom opening in said extension, said plate having pivot means for providing a rotational degree of freedom about a pivot axis relative to said supporting structure, said pivot axis extending through the center of the plane of said plate;
      ii) an extension from said plate mounted upon and extending outward from the pivot axis perpendicular to the plane of said plate, the arrangement, dimensions and balance of the plate and plate extension being such that, when undisturbed, the plate is horizontal and the plate extension is vertical with the extension extending downward into said feed trough where a feeding animal can move an end of the downward extension horizontally to incline the plate extension from vertical and the plate from horizontal.

2. Apparatus as in claim 1 where said downward extension comprises a funnel with its central opening being generally linear, with the large top opening of the funnel extending upward, being attached to and enclosing said plate such that with the funnel opening vertical the plate is horizontal; the plate dimension perpendicular to the pivot axis being less than an inside dimension of the funnel about the plate and perpendicular to the pivot axis being such as to provide opposed openings on each side of the pivot axis between an outside edge of the plate and the inside wall of the funnel to permit feed to fall through one of the opposed openings when the plate is inclined from horizontal.

3. Apparatus as in claim 2 with said funnel having first adjustable stop means which interact with said supporting structure for limiting the movement of the lower end of the funnel in either direction from vertical to limit the inclination of the plate from horizontal.

4. Apparatus as in claim 1 with said downward extension having side adjustment means for extending the effective length of said downward extension such that the distance of the hopper extension above said plate can be changed.

5. Apparatus as in claim 3 with said funnel having second adjustable stop means which interact with said hopper extensions for limiting the movement of the upper end of the funnel, being arranged to interact with the hopper extension such as to jar grain located within the hopper extension through the bottom opening in the hopper extension.

* * * * *